(12) United States Patent
Shively et al.

(10) Patent No.: US 7,079,845 B2
(45) Date of Patent: Jul. 18, 2006

(54) SYSTEM AND METHOD FOR DYNAMIC SCHEDULING OF CHANNELS IN A CODE DIVISION MULTIPLE ACCESS SYSTEM

(75) Inventors: David S. Shively, Smyrna, GA (US); Melvin D. Frerking, Norcross, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 588 days.

(21) Appl. No.: 10/147,387

(22) Filed: May 16, 2002

(65) Prior Publication Data

US 2004/0203821 A1 Oct. 14, 2004

(51) Int. Cl.
*H04Q 7/20* (2006.01)
(52) U.S. Cl. .................. 455/452.1; 370/329; 370/337; 370/347; 370/348; 370/431; 370/442; 370/468
(58) Field of Classification Search ............... 455/452, 455/452.1; 370/473, 329, 337, 347, 348, 370/431, 442, 468
See application file for complete search history.

(56) References Cited

U.S. PATENT DOCUMENTS

| | | | | |
|---|---|---|---|---|
| 6,768,728 | B1* | 7/2004 | Kim et al. | 370/342 |
| 2002/0159395 | A1* | 10/2002 | Nelson et al. | 370/252 |
| 2002/0191564 | A1* | 12/2002 | Kuo | 370/333 |

* cited by examiner

*Primary Examiner*—Joseph Feild
*Assistant Examiner*—Pierre-Louis Desir
(74) *Attorney, Agent, or Firm*—Parks Knowlton LLC; J. Perry Herndon, Esq.; Coulter C. Henry

(57) ABSTRACT

A base station system for dynamically allocating channels to an incoming data stream. The base station system comprises an input for receiving the incoming data stream and a processor for receiving the incoming data stream from the input. The processor is operable to determine a desired level of service for the incoming data stream; dynamically assign a plurality of channels to the incoming data stream; segment the incoming data stream into a plurality of segments based on the number of channels dynamically assigned; and provide a parallel stream of the segmented data stream to a plurality of respective coders for coding the respective segments of the data stream.

3 Claims, 4 Drawing Sheets

PRIOR ART - 20 ms. Frame 210

| Code 1 | A1 | B1 | ~~C1~~ | D1 | E1 | A2 | B2 | C2 | D2 | E2 | A3 |
|---|---|---|---|---|---|---|---|---|---|---|---|
| Time (ms) | 0 | 4 | 8 | 12 | 16 | 20 | 24 | 28 | 32 | 36 | 40 |

C1 data received with errors - entire 20ms frame is discarded

Exemplary Throughput of the Present Invention 220

| | | | | | | | | | | |
|---|---|---|---|---|---|---|---|---|---|---|
| Code 1 | A1 | | | | | A2 | | | | | A3 |
| Code 2 | B1 | | | | | B2 | | | | | B3 |
| Code 3 | ~~C1~~ | | C1 | | | ~~C2~~ | | ~~C2~~ | | C2 | C3 |
| Code 4 | D1 | | | | | D2 | | | | | D3 |
| Code 5 | E1 | | | | | ~~E2~~ | | E2 | | | E3 |
| Time (ms) | 0 | 4 | 8 | 12 | 16 | 20 | 24 | 28 | 32 | 36 | 40 |

C1 data is retransmitted;      C2 and E2 are retransmitted      C2 again

Figure 2

SYSTEM AND METHOD FOR DYNAMIC SCHEDULING OF CHANNELS IN A CODE DIVISION MULTIPLE ACCESS SYSTEM

TECHNICAL FIELD

This invention relates to the field of mobile telecommunications, and, more particularly, to systems methods for dynamically assigning channels, or codes, in a wireless code division multiple access (CDMA) system.

BACKGROUND

A bandwidth squeeze is upon us. As more mobile telephony carriers vie for space in a limited RF spectrum, the need to use bandwidth efficiently has never been more pressing. Adding greater urgency to the need to maximize efficiency within a given bandwidth is the growth of data traffic over mobile networks. Thus, the search is on for eliminating wasted bandwidth and system inefficiencies.

One method of communicating voice and data traffic wirelessly is known as code division multiple access or CDMA. In a CDMA system, multiple channels are shared over a distinct RF carrier. Typical CDMA wireless systems utilize unique codes to identify individual channels that occupy the same radio frequency (RF) carrier. During the initial call set-up, a code is assigned to carry the traffic (typically 20 ms frames made of voice bits and/or data bits) from the base station to the mobile station. The transfer rate for a voice calls on a typical code channel is approximately 9.6–14.4 kbps. For non-voice traffic, higher data rates can be achieved through the use of multiple code channels, i.e. several code channels can be used in parallel to increase the data rate. In this way, multiple channels can deliver 20 ms. frames of data to the mobile concurrently yielding a higher overall data rate. Necessary data rates may change on the fly during the course of a conversation or data transfer, and, thus, it would be efficient to be able to dynamically allocate codes or bandwidth on the fly. In current systems, however, the assignment of a code, or codes, for each mobile station is done during call set-up or through a change of service order during an existing call.

In addition to the fact that the existing method for assigning each code, or codes, does not allow for quickly changing the number of codes allocated to each user, existing systems generally assign a single code channel to a single user. Thus, they do not permit multiple users to share a code channel in the midst of a 20 ms. frame. As an example, consider a voice call on a standard CDMA system. A vocoder takes the analog stream of voice data, for example, and converts the analog stream into a digital data stream of bits. The bits that come from the vocoder are arranged into 20 ms. frames and are sent from a base station to a mobile station typically using a single code on the CDMA carrier signal. In this case, if part of the 20 ms frame is received with errors, there is no way to resend the information and the entire frame is discarded. In addition, by limiting the granularity of the system to code channels in 20 ms. frame allotments, bandwidth is often wasted that is unused within a frame.

Existing CDMA systems are unable to rapidly respond to changes in the offered traffic load, and time is wasted during call set-up or during a change of service order. As wireless systems continue to emphasize data traffic, the potential waste in existing CDMA systems could be even larger due to the rapidly changing load requirements of packet data.

The present invention is directed to overcoming one or more of the above shortcomings with existing CDMA systems.

SUMMARY OF THE INVENTION

A base station system for dynamically allocating channels to an incoming data stream is disclosed. The base station system comprises an input for receiving the incoming data stream and a processor for receiving the incoming data stream from the input. The processor is operable to determine a desired level of service for the incoming data stream; dynamically assign a plurality of channels to the incoming data stream; segment the incoming data stream into a plurality of segments based on the number of channels dynamically assigned; and provide a parallel stream of the segmented data stream to a plurality of respective coders for coding the respective segments of the data stream.

Further, a method of transmitting a data stream in a code division multiplexing access system is disclosed. The method comprises receiving the incoming data stream; determining a desired level of service for the incoming data stream; dynamically assigning a plurality of channels to the incoming data stream; segmenting the incoming data stream into a plurality of segments based on the number of channels dynamically assigned; and coding the segments of the data stream in parallel.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 2 illustrates a comparison of data error handling between a prior art code assignment and a typical code group assignment according to the principles of the present invention.

DETAILED DESCRIPTION

Figure 1:
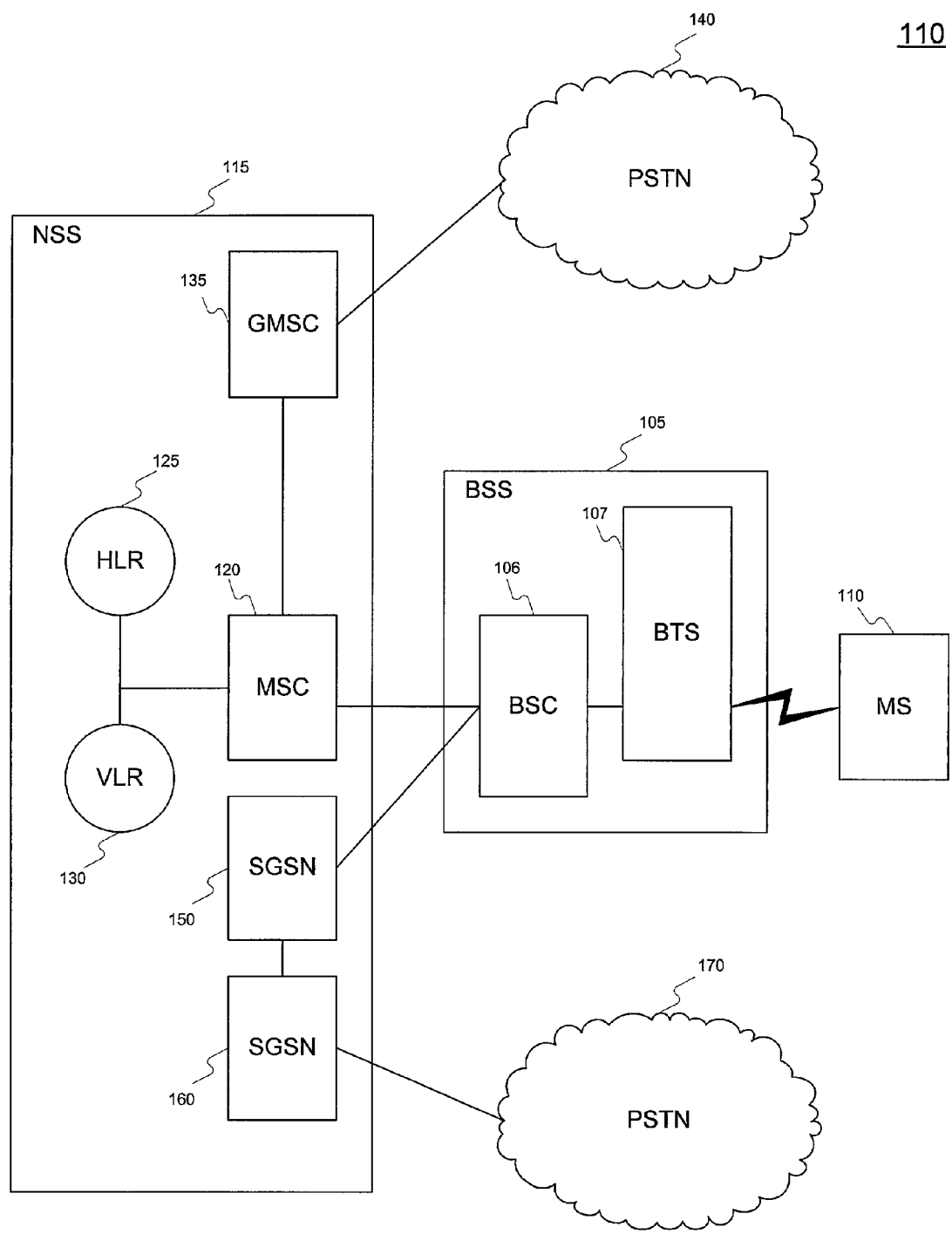
FIG. 1 illustrates an exemplary system for implementing dynamic channel scheduling in a CDMA wireless telecommunication system 100.

Reference will now be made to various embodiments according to this invention, examples of which are shown in the accompanying drawings and will be obvious from the description of the invention. In the drawings, the same reference numbers represent the same or similar elements in the different drawings whenever possible.

Environments in Which Exemplary Embodiments of the Present Invention May Operate FIG. 1 illustrates an exemplary system for implementing dynamic channel scheduling in a CDMA wireless telecommunication system 100. System 100 may comprise a base station subsystem (BSS) 105, a mobile station (MS) 110, and a network and switching subsystem (NSS) 115.

System 100 may utilize any wireless technology that utilizes code division multiple access schemes for communications of voice and data over an air interface. Those skilled in the art will appreciate that wireless telecommunication standards may be employed such as, for example, CDMA, CDMA 2000, UMTS, and any other standard utilizing code division multiple access technology without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 106 and base transceiver station (BTS) 107. BSS 105 connects to MS 110 over an air interface and connects to NSS. Embodiments of the present invention may be implemented within the BSS 105 and/or within the MS 110. Within the BSS 105, embodiments of the present invention may be implemented within the BSC 106 or the BTS 107. The BSC 106 and BTS 107 both comprise processors with associated memory and input/output for carrying out communications functions.

BSC 106 controls BTS 107 and may control a plurality of other base transceiver stations in additional to BTS 107. BTS 107 may comprise radio transmission and reception equipment located at an antenna site. Associated with BSS 105, a transcoder/rate adaption unit (TRAU) (not shown) carries out speech encoding and speech decoding and rate adaptation for transmitting data. As a subpart of BTS 107, the TRAU may be located away from BTS 107, for example, at a mobile switching center located in NSS 115. When the TRAU is located in this way, the low transmission rate of speech code channels allows more compressed transmission between BTS 107 and the TRAU.

MS 110 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 110 may utilize cellular telephone protocols such as wireless application protocol (WAP), or blue-tooth protocol. Such mobile systems may also be configured to permit the user to purchase products through a browser on a display of the mobile device. Those skilled in the art will appreciate that embodiments of the present invention are not limited to a particular form of mobile system or communications protocol. And those of ordinary skill in the art will recognize that other systems and components may be utilized within the scope and spirit of the invention.

MS 110 may be a stand-alone piece of equipment for certain services or support the connection of external terminals, such as the interface for a personal computer or facsimile machine. MS 110 may include mobile equipment (ME), such as mobile phone 110; or a subscriber identity module (SIM). The ME does not need to be personally assigned to one subscriber. UMTS phones may use a SIM card that contains user account information, as UMTS phones may be automatically programmed by plugging in the SIM card. This allows UMTS phones to be used interchangeably in situations such as renting or borrowing. When a subscriber's SIM is inserted into the ME of MS 110, all calls for the subscriber are delivered to MS 110. Thus, the ME is not associated with a particular number, but rather, is linked to the subscriber's SIM. In addition, UMTS may include Short Messaging Service (SMS) that enables text messages to be exchanged.

NSS 115 may comprise a mobile switching center (MSC) 120, a Serving GPRS Support Node (SGSN) 150, a Gateway GPRS Support Node (GGSN) 160, a home location register (HLR) 125, a visitor location register (VLR) 130, and a gateway mobile switching center (GMSC) 135. NSS 115 manages the communication between subscribers, for example, a subscriber using MS 110, and other telecommunications users, for example, those using publicly switched telephone network (PSTN) 140. PSTN 140 may comprise, for example, the worldwide voice telephone network.

The BSC 106 may be coupled to a Serving GPRS Support Node (SGSN) 150 that handles packet data communication to the mobile station 110. The SGSN provides packet routing, including mobility management, authentication and ciphering, to and from a GPRS subscriber on mobile station 110. The SGSN 150 communicates with the Gateway GPRS Support Node (GGSN) 160 to interface to a packet based network, such as Internet 170. The GGSN provides the gateway to the packet based network, handles security and accounting functions, and allocates IP addresses to the mobile station 110. The GGSN 160 and SGSN 150 comprise the packet data nodes of a GSM/GPRS core network. In this way packetized data, i.e. Internet traffic, is transferred between the mobile station 110 and the Internet 170 over a standard GSM/GPRS interface.

MSC 120 coordinates call set-up to and from users such as those using MS 110. MSC 120 may control several base station controllers such as, and similar to BSC 106. GMSC 135 is used to interface with external networks for communication with users outside of the wireless system, such users on PSTN 140.

HLR 125 may comprise a stand-alone computer without switching capabilities, a database which contains subscriber information, and information related to the subscriber's current location, but not the actual location of the subscriber. The HLR 125 may manage the security data for subscriber authentication. Another sub-division of HLR 125 may include an equipment identity register (EIR) (not shown) which may store data relating to mobile equipment (ME).

The VLR 130 links to one or more mobile switching center located on other systems, temporarily storing subscription data of subscribers currently served by MSC 120. The VLR 130 may hold more detailed data than HLR 125. For example, the VLR 130 may hold more current subscriber location information than the location information at HLR 125.

GMSC 135 is utilized to interface with PSTN 140. In order to set up a requested call, the call is initially routed to GMSC 135 that finds the correct home location register by knowing the director number of the subscriber. GMSC 135 has an interface with an external network, such as PSTN 140, for routing communications.

Methodology of the Operation of the Present Invention

While prior art CDMA systems typically assign channels or codes for each mobile station during call setup or through a change of service order during an existing call, exemplary embodiments consistent with the present invention provide for dynamically allocated codes or groups of codes to a particular mobile station. According to these principles, codes can be dynamically assigned by a code scheduler to transfer a required amount of data to a particular mobile station in order to provide a typically parallel burst of data to the station in a typically reduced period of time from prior art CDMA systems. Following transfer of the data, these codes may be reused through reassignment by the code scheduler to a different mobile station to transfer a burst of parallel data to that mobile station.

In order to accomplish this operation, a typical frame length may be subdivided into miniframes. For example, a 20 ms. frame may be subdivided into 5 miniframes of 4 ms. length. Where a prior art system may allocate a single code, or channel, to a particular mobile station for transferring data across the entire 20 ms. frame, embodiments of the present invention may dynamically assign to the mobile station 5 codes, or channels, for a single 4 ms. miniframe in length. This would transfer data in a 4 ms. miniframe that previously took a full 20 ms. miniframe to transfer. In addition, the present invention may then reuse those codes for the same or another mobile station for the remaining 16 ms. of the 20 ms. frame. This provides for enhanced bandwidth efficiency by freeing up bandwidth that might go unused.

Therefore, not only do embodiments of the present invention provide for faster transfer of bursts of data to a given mobile station, but embodiments also permit faster recovery from transfer errors due to the increased granularity of the system. For instance, should there be a transmission error in a prior art CDMA system, retransfer would have to wait until the next full 20 ms. frame, and the entire 20 ms. frame of data would be discarded. However, embodiments of the present invention provide for segmenting the data into smaller miniframes across a plurality of codes, or channels, facilitating more rapid retransmission of data having errors and, because the data is in smaller chunks, retransmission of less data. By reducing the amount of data lost in a transmission error and reducing the retransmission lag, the embodiments of the present invention facilitate more efficient use of bandwidth.

As more non-voice, packetized data is transferred across wireless networks, the efficiency of prior art CDMA systems increasingly becomes reduced because of the bursty nature of such transmissions.

FIG. 2 illustrates a comparison of data error handling between a prior art code assignment and a typical code group assignment according to the principles of the present invention. The tables illustrate the transfer of data segments A1–E1 and A2–E2, where a data error occurs on transfer segment C1.

In table 210, a mobile station is assigned a forward channel code 1 for transferring the above data segments across two 20 ms. frames. It takes two full frames to transfer the data because of the amount of data and the limitations of the prior art system. The limitation being that only a single code is assigned to a given mobile station. At time t=0 ms., the A1 data segment is transferred across channel code 1 to the mobile station. At time t=4 ms., the B1 data segment is transferred across channel code 1 to the mobile station. This continues through time t=36 ms. where data segment E2 is transferred.

In this example, data segment C1 had an error occur during transmission. In the prior art system the entire 20 ms. frame, A1–E1 is discarded. This occurs despite the fact that the remainder of the data segments were transmitted without error. In other words, prior art systems treat the entire 20 ms. frame as a single unit. In addition, the retransmission of data segment C1 is going to be delayed because the second frame of A2–E2 has already begun. Table 210 illustrates the inefficient operation of prior art systems.

Table 220 illustrates the transfer of the plurality of data segments according to an exemplary embodiment of the present invention. Once again, data segments A1–E1 and A2–E2 are to be transferred. But in this example, the frame has been broken into a plurality of miniframes and the dynamic scheduler of the present invention has assigned a code group of channels code 1 through code 5 to the mobile station. Therefore, A1–E1 are transferred rapidly during the first miniframe. Upon detection of the error in C1, only C1 is discarded and C1 is retransmitted two miniframes later. In addition, this table illustrates data segments C2 and E2 being in error and retransmitted two miniframes later where C2 is once again in error and must be retransmitted. Despite these additional error conditions, the data segments are transferred to the mobile station in a faster and more efficient manner than the prior art. Less data is discarded and faulty data is retransmitted in a shorter period of time.

Figure 3:
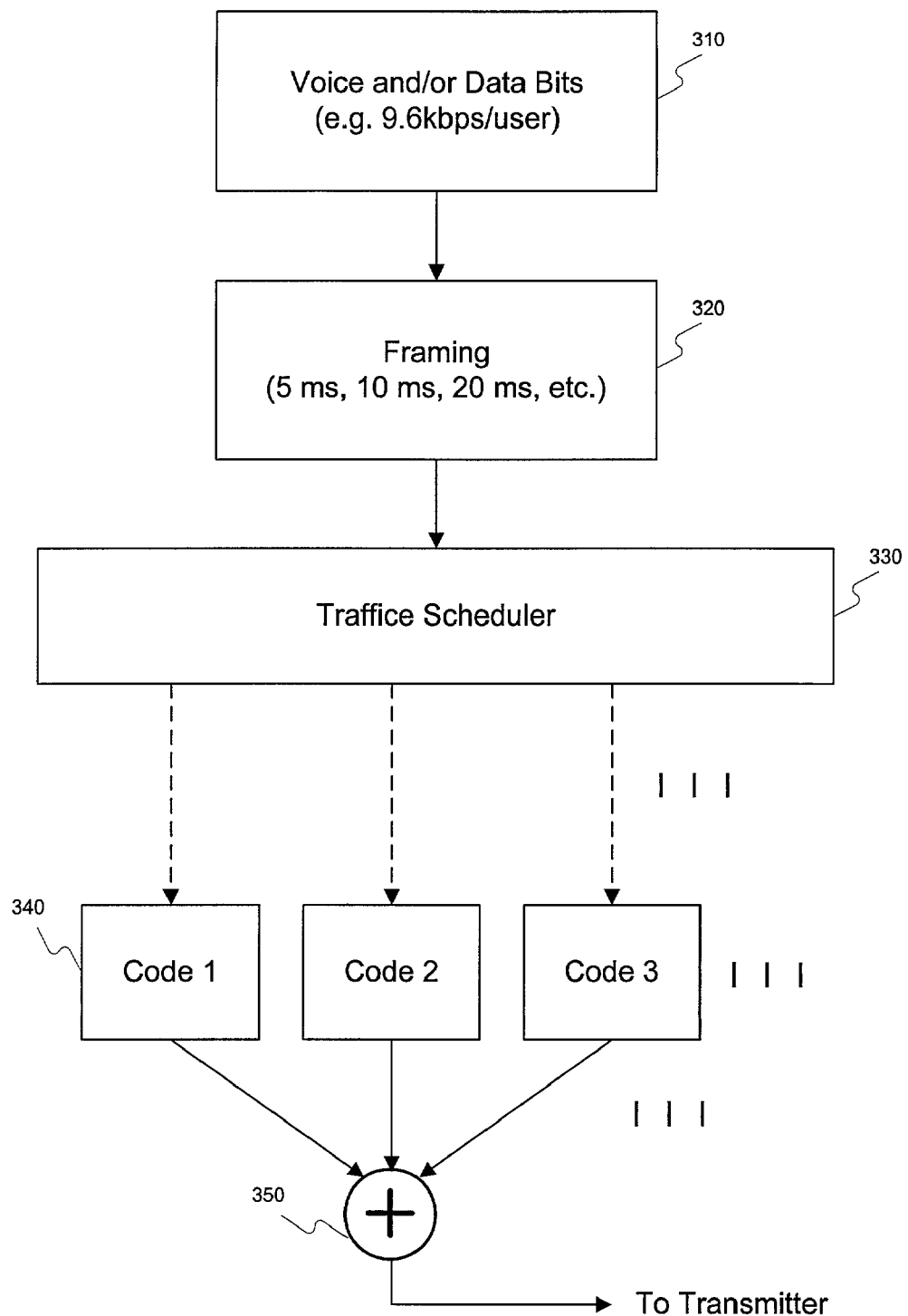
FIG. 3 illustrates the assignment operation of the traffic scheduler of the present invention to voice and/or data traffic.

FIG. 3 illustrates the assignment operation of the traffic scheduler of the present invention to voice and/or data traffic. As data traffic arrives at the base station system at stage 310, the data is framed at stage 320. The framing at stage 320 may be in any frame length, but, typically, is placed in a 20 ms. frame. The traffic scheduler 330 receives the incoming framed data an assigns one or more code channels to the mobile unit to which the incoming data is destined. The traffic scheduler also segments the frames into a plurality of miniframes. For example, the traffic scheduler may segment the frames into 4 miniframes of 5 ms. each. Depending upon the type of data traffic, the traffic scheduler may assign more or less codes to the incoming data stream. For example, a data stream requiring a high quality of service may be assigned a greater number of codes than a data stream requiring a low quality of service.

Once the number of codes is assigned to the incoming data stream, the data stream is segmented into the appropriate size, based on the length of the miniframe, and sent to the coders 340. Following the parallel coding of the data segments, the coded data segments are summed in summer 350 and sent to the transmitter (not shown).

Figure 4:
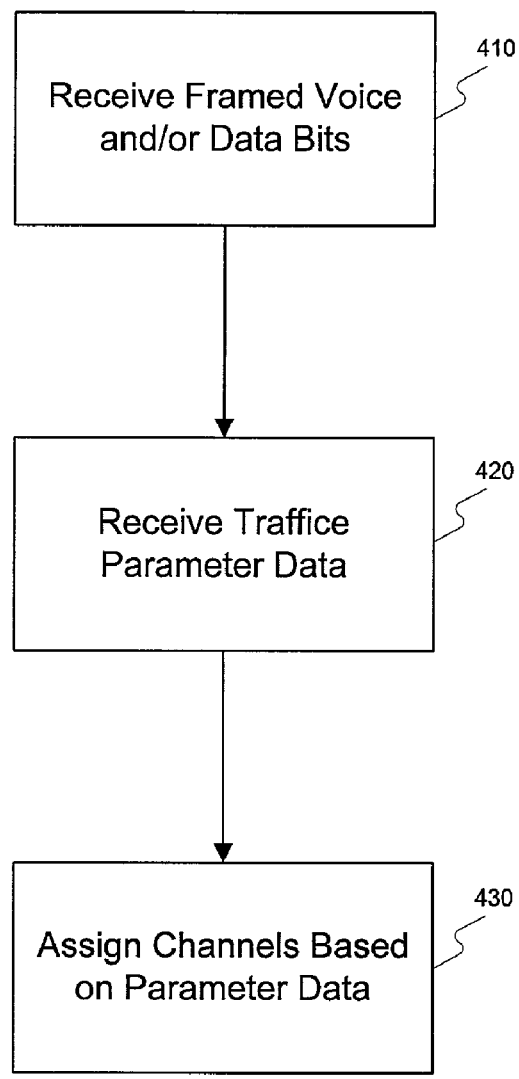
FIG. 4 is a flow chart illustrating operation of the dynamic traffic scheduler 330.

FIG. 4 is a flow chart illustrating operation of the dynamic traffic scheduler 330. At stage 410, the traffic scheduler receives the framed voice and/or data bits. At stage 420, the traffic scheduler receives or looks up internally parameter relating to the quality of service required for the incoming stream of data. The higher the quality of service required, the greater the number of channels assigned to the data stream. At stage 430, channels are assigned to the data stream based on the parameter data and the incoming data stream is segmented. The segmented data stream is sent in parallel to be coded and sent to the transmitter. Those skilled in the art will appreciate that the bandwidth assigned to a particular incoming data stream can be determined on a number of factors known to those skilled in the art.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A base station system for dynamically allocating channels to an incoming data stream, comprising:
   an input for receiving the incoming data stream; and
   a processor for receiving the incoming data stream from the input and operable to:
   determine a desired level of service for the incoming data stream;
   dynamically assign a plurality of channels to the incoming data stream;
   segment the incoming data stream in a plurality of first data segments, each plurality of the first data segments corresponding to a first time slot respectively contained in the plurality of dynamically assigned channels;
   segment the plurality of first data segments into a plurality of second data segments that are smaller than the first data segments, the plurality of second data segments being assigned to at least one of a plurality of second time slots, the plurality of second time slots occurring within the first time slot;
   transmit each of the second data segments during the plurality of second time slots to a plurality of respective coders; and
   retransmit, during a separate second time slot contained in the first time slot, at least one of the second data segments if the at least one of the second data segments is not properly received by its respective coder.

2. A method of transmitted a data stream in a code division multiplexing access system, comprising:
   dynamically assigning a plurality of channels to the incoming data stream, based on a predetermined desired level of service;
   segmenting the incoming data stream into a plurality of first data segments, each plurality of first data segments corresponding to a first time slot respectively contained in the plurality of dynamically assigned channels;
   segmenting the plurality of first data segments into a plurality of second data segments that are smaller than the first data segments, the plurality of second data segments being assigned to at least one of a plurality of second time slots, the plurality of second time slots occurring within the first time slot;
   transmitting to a coder, each of the second data segments during the plurality of second time slots to a plurality of respective coders, and
   retransmitting, during a separate second time slot contained in the first time slot, at least one of the second data segments if the at least one of the second data segments is not properly received by its respective coder.

3. A base station system for dynamically allocating channels to an incoming data stream comprising:
   a processor for receiving the incoming data stream and operable to: determine a desired level of service for the incoming data stream;
   dynamically allocate a plurality of channels to the incoming data stream based on the desired level of service;
   segment the incoming data stream into a plurality of first data segments, wherein each plurality of first data segments correspond to a first time slot respectively contained in the plurality of dynamically allocated channels;
   segment the plurality of first data segments into a plurality of second data segments that are smaller than the first data segments, wherein the plurality of second data segments are assigned to at least one of a plurality of second time slots, wherein the plurality of second time slots occur within the first time slot;
   simultaneously transmit to a coder each of the second data segments during the plurality of second time slots to a plurality of respective coders, wherein the plurality of second time slots occur during the first time slot; and
   retransmit the second data segments, if the second data segment is not properly received by the coder; during a separate second time slot contained in the first time slot.

* * * * *